United States Patent [19]

Brooks

[11] Patent Number: 4,712,888
[45] Date of Patent: Dec. 15, 1987

[54] SPATIAL LIGHT MODULATOR SYSTEMS
[75] Inventor: Robert E. Brooks, Manhattan Beach, Calif.
[73] Assignee: TRW Inc., Redondo Beach, Calif.
[21] Appl. No.: 892,665
[22] Filed: Aug. 4, 1986
[51] Int. Cl.[4] .................... G02B 26/08; G02B 26/00; H01L 25/00
[52] U.S. Cl. .................................. 350/486; 250/332; 350/360
[58] Field of Search ...................... 350/360, 361, 486; 250/332, 334

[56] References Cited

U.S. PATENT DOCUMENTS 4,592,628  6/1986  Altman et al. ................. 350/360

Primary Examiner—John K. Corbin
Assistant Examiner—Vincent J. Lemmo
Attorney, Agent, or Firm—Bogucki Raymond A.; Thomas N. Giaccherini

[57] ABSTRACT

A system for deriving parallel data from a source, such as a detector array within an enclosed cryogenic volume utilizes remote optical sensing of micromechanical modulators so as to minimize power requirements and heat loss while providing full bandwidth operation. Subgroupings of the detector elements are used in multiplexed fashion to drive high speed micromechanical modulators in binary fashion until the entire detector array has been scanned. The deflection states of the micromechanical modulators are remotely sensed by optical means and the parallel data then reassembled or processed as desired. With this configuration the detector and modulator arrays may be disposed compactly within a cryogenic enclosure and external thermal inputs limited to low levels.

23 Claims, 7 Drawing Figures

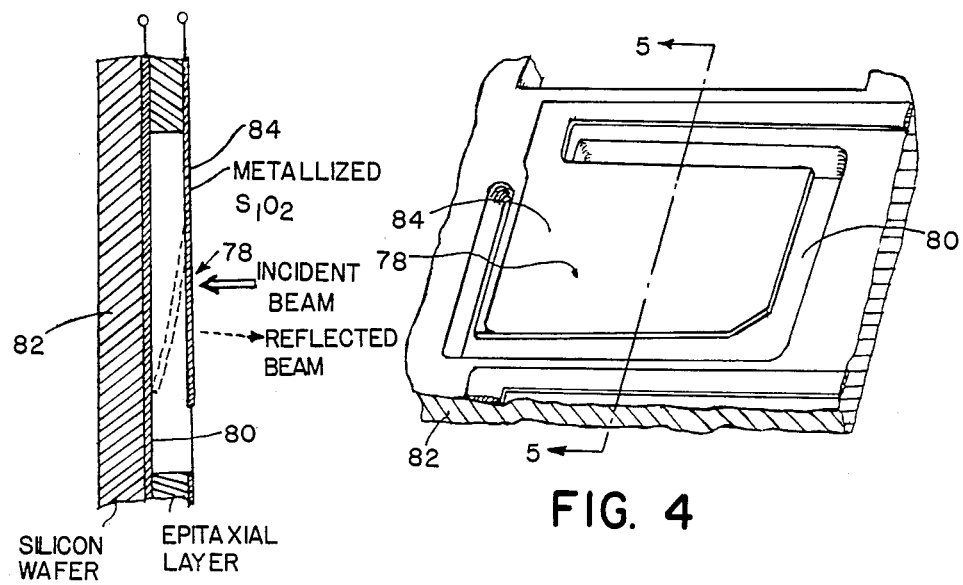
FIG. 5
FIG. 4
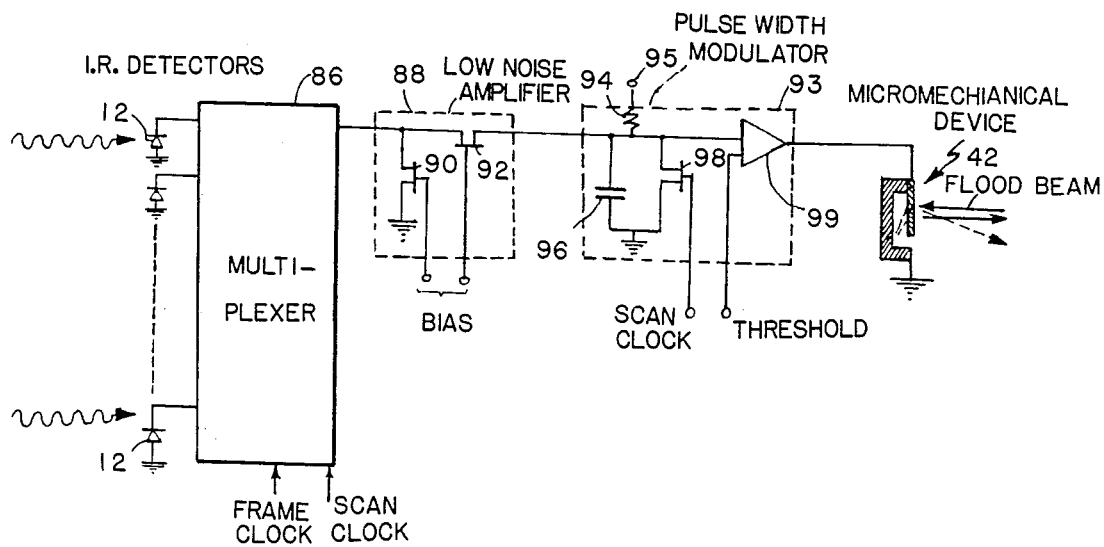
FIG. 6

SPATIAL LIGHT MODULATOR SYSTEMS

BACKGROUND OF THE INVENTION

An article by Robert E. Brooks entitled "Micromechanical Light Modulators On Silicon" in *Optical Engineering*, Jan./Feb. 1985, pp. 101–106 describes some of the history of the development of display and signal processing systems using minute, reflective, individually deflectable elements. From the earlier use of deformable membranes to generate television images, the technology has advanced to integrated circuit fabrication techniques in which very small cantilevered elements extend above an etched well, for use in digital data processing applications. The state of development in this technology is evidenced by an article by K. E. Petersen entitled "Micromechanical Light Modulator Array Fabricated On Silicon", *Applied Physics Letters* 31, No. 8, pp. 521–523 (1977), and also in U.S. Pat. No. 4,229,732 issued Oct. 20, 1980 to Petersen and Hartstein. The geometry of the beams or paddles is precisely defined by a pattern of etchable and non-etchable materials used in integrated circuit fabrication, and the circuit structure may also include semiconductor control circuitry and devices.

The cantilevered element is typically a silicon beam or paddle having a very thin reflective metallic coating. An electrostatic charge on the cantilevered element relative to the well determines the extent of deflection of the element. This type of device is advantageous because very small micromechanical modulators (e.g. 60 microns on a side) can be fabricated with close center-to-center spacings (e.g. 87.5 microns). Thus they can be distributed in small arrays of desired resolution and overall size. The individual elements are compatible with the sizes of other elements, such as sensor arrays, that may be fabricated by modern integrated circuit techniques.

When illuminated with a flood beam of light, the micromechanical modulator array provides a means of high speed parallel transmission of a great amount of data. While the first uses of such modulator arrays were for generating TV displays, attention was thereafter directed to other functions, such as generating Fourier transforms. More recently, the parallel processing implications have been considered at length relative to optical interconnection, with data or without transformation, of microelectronic circuits. A summary of thinking in this respect has been provided by J. W. Goodman et al in "Optical Interconnections For VLSI Systems", *Proceedings of the IEEE*, Volume 72, No. 7 (July 1984), p. 850 et seq. This article mentions some of the practical considerations involved in implementation of these systems, as does the above-referenced article by Brooks. Further, the Brooks article also discusses possibilities for usage of micromechanical light modulators for optical plane readout, image subtraction, nonlinear image processing and matrix arithmetic. In some of such systems, and also in recently issued U.S. Pat. No. 4,569,033 to Collins et al, entitled "Optical Matrix-Matrix Multiplier Based On Outer Product Decomposition", manipulation of parallel signals in the course of transmission is shown to be conceptually feasible. However, providing practical systems that have a desired bandwidth, low power drain, signal-to-noise ratio, and intercommunication capability at reasonable cost presents many problems that have heretofore not been confronted in detail. An example is the application of this technology to the generation of output signals from low noise sensor arrays. Such arrays must be cryogenically cooled and thermally isolated. Thus it is not desirable to couple a large number of leads into the low temperature zone because of heat losses through the wires. Also, in order to minimize energy requirements, the available volume about the sensor array is usually very limited, and this substantially complicates the problems of obtaining adequate level output signals.

SUMMARY OF THE INVENTION

Spatial light modulator systems in accordance with the invention dispose an externally powered system of electronic circuits between a cryogenically cooled sensor array facing in one direction and a lesser number of micromechanical modulators in an array facing in the opposite direction within an insulating housing. Radiant energy images falling on the detector array through a window in the housing are segmented into pixels arranged in subgroups, and the detector array is scanned in sequential fashion in synchronism by the circuits. The micromechanical modulators are driven in synchronism and their deflections are detected externally by reflection of a flood beam passing through a small window onto the modulator array and reflecting to external detector elements.

In a more specific example of a system in accordance with the invention, a cryogenic cooler within a system housing maintains a thermally conductive support at cryogenic temperatures, to cool a multi-element infrared detector array. The array is divided into a number of like subarrays, each of which is internally divided into like subgroupings having a limited number of detector elements. Integrated circuits, externally powered, are disposed between the detector array and a linear micromechanical modulator array that corresponds in number to the total elements in subgroupings from each subarray. The circuits include scanner circuits for sequentially coupling subgroupings from the detector array, low noise amplifiers and pulse width modulator circuits. These circuits drive the individual ones of the linearly arrayed micromechanical modulator elements in the readout array, which is illuminated through a small window from outside the cryogenic housing. Light reflected off the modulator elements is transmitted past a Schlieren stop to a corresponding number of elements in a second detector array, which is outside the housing and responsive to light from the illuminating beam. When driven, the individual micromechanical modulators are fully deflected to a given limit position, for a time interval determined by the pulse width modulated signal applied thereto. Output circuits operated synchronously with the scanning or multiplexing of the detector array reassemble the image for processing in digital or analog fashion. With this arrangement the entire infrared detector array can be scanned at a repetition rate commensurate with its own capabilities, because of the high input rates response characteristics of the detector elements. The arrangement is compact, has low power drain and provides the thermal insulation that is required to avoid excessively rapid dissipation of the cryogenic fluid. Except for external power and synchronization signal leads there are no heat dissipating wires to the outside. The internal power requirements are very low because of the limited number of micromechanical modulator elements and the low charges needed by them for full deflection.

BRIEF DESCRIPTION OF THE DRAWINGS

A better understanding of the invention may be had by reference to the following description, taken in conjunction with the accompanying drawings, in which:

FIG. 4 is a perspective view, partially broken away, of a micromechanical modulator element that may be used in the system of FIG. 1;

FIG. 5 is a side sectional view of the modulator element of FIG. 4, taken along the line 5—5 therein and looking in the direction of the appended arrows;

FIG. 6 is a combination block and schematic diagram of signal processing circuits for use in the system of FIGS. 1 to 3.

DETAILED DESCRIPTION OF THE INVENTION

Figure 1:
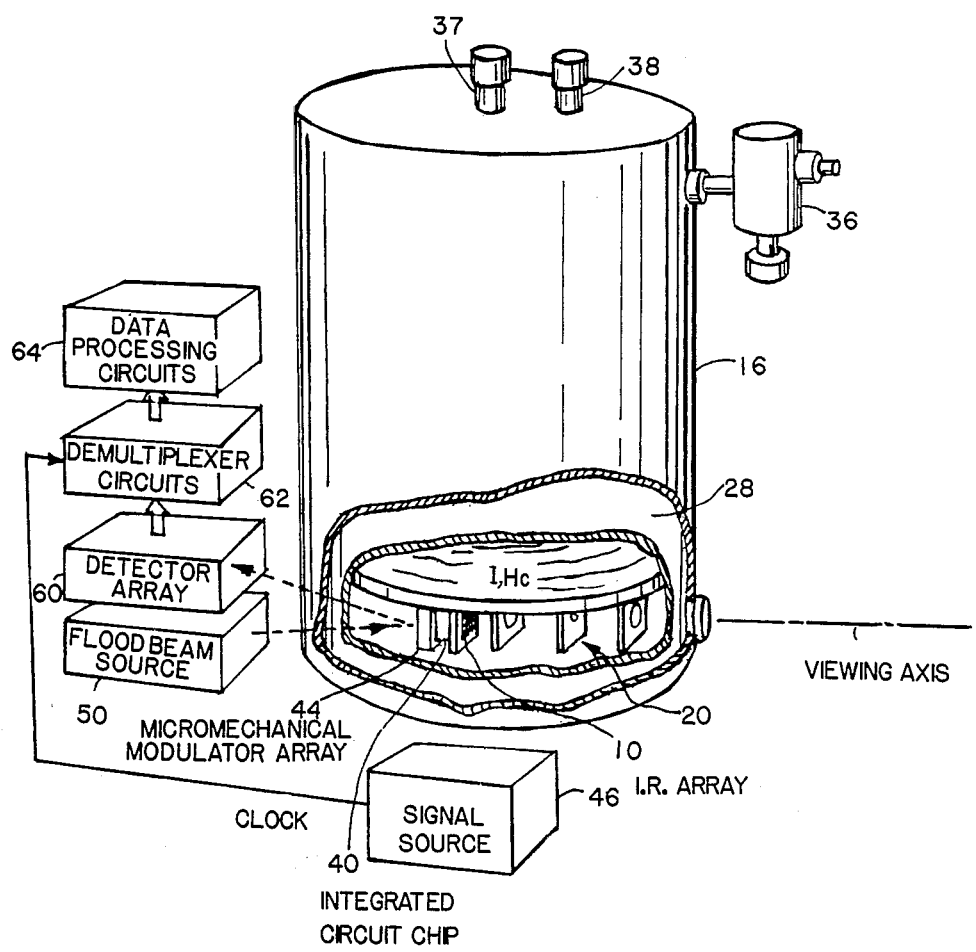
FIG. 1 is a perspective and block diagram view of the principal elements of a cryogenically cooled detector array and readout system in accordance with the invention.
Figure 2:
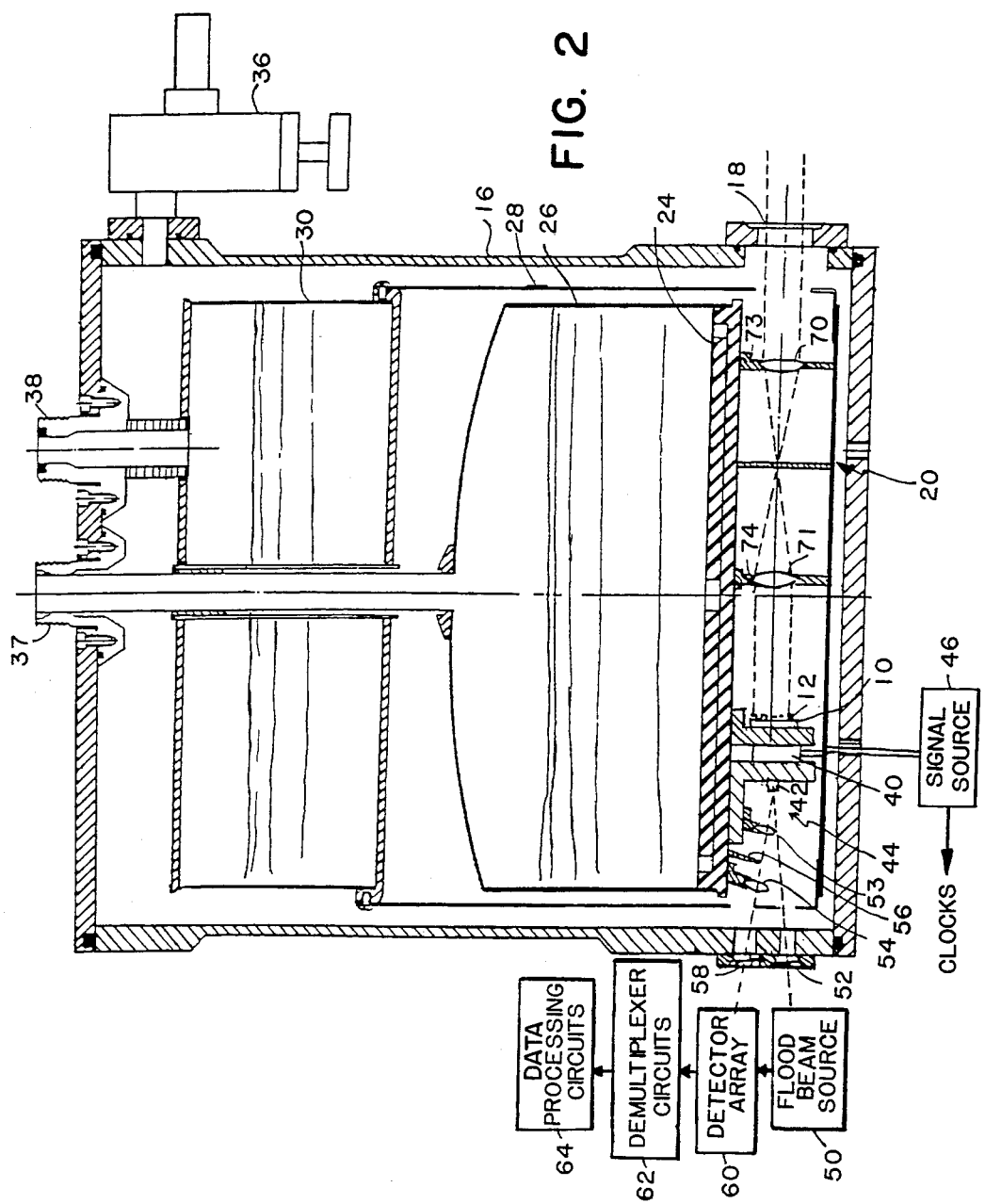
FIG. 2 is a combined schematic and block diagram view, partially broken away, of the system of FIG. 1.
Figure 3:
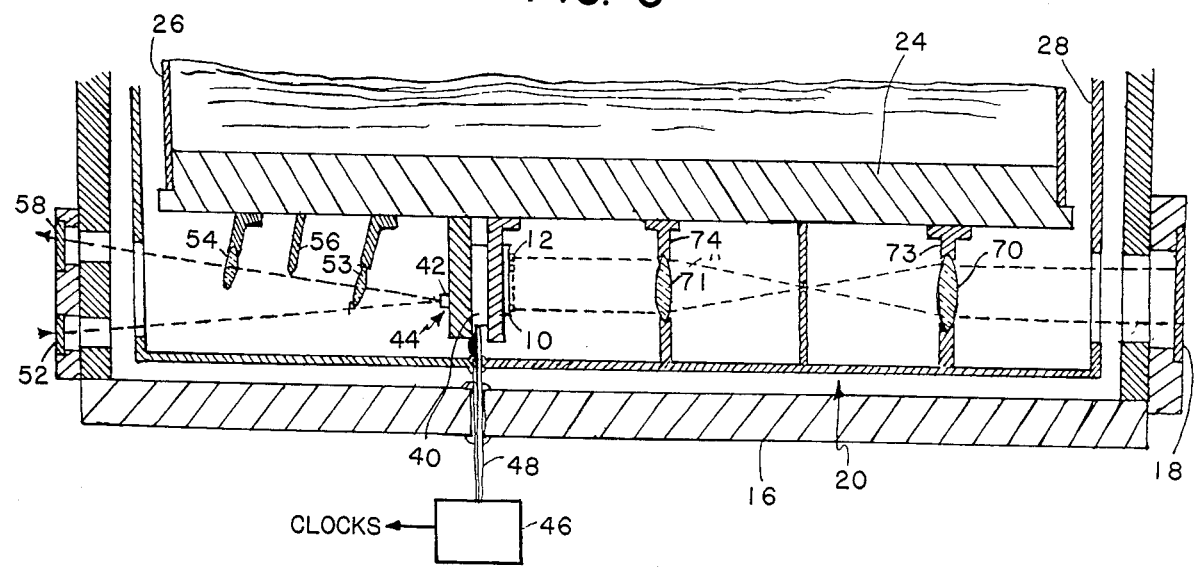
FIG. 3 is a sectional view of a portion of the arrangement of FIG. 2, showing further details thereof.

Referring to FIGS. 1 to 3, an example of a system in accordance with the invention comprises a radiant energy detector array 10 (best seen in FIG. 3), typically a large number of individual infrared energy detector elements 12, disposed in a rectangular configuration of columns and rows. Although the detector array 10 may be selected to be responsive to any particular wavelengths of radiant energy desired, the problems are most crucial and demanding with infrared energy systems, and the example will be described in this context. The detector array 10 is aligned transversely and symmetrically relative to a viewing axis to be responsive to an infrared image in the field of view. A cryogenically cooled environment for the detector array 10 is provided within a housing 16 that encompasses most of the operative elements of the system. Along the viewing axis on the side of the field of view, infrared energy passes through the wall of the housing via an infrared transmissive window 18 and a focusing lens system 20, to fall on the detector array 10.

Within the housing 16, referring particularly to FIGS. 2 and 3, the array 10 is mounted on a holder 22 that is thermally conductive and attached to a cold work surface 24 that forms the base for a lower, liquid helium vessel 26. The cold work surface 24 and liquid helium vessel 26 are surrounded within the housing by a cylindrical radiation shield 28 having only small openings in opposite walls. The environment within the radiation shield 28 and immediately about the liquid helium vessel 26 is brought down to a cryogenic temperature level by an upper liquid nitrogen vessel 30 in thermal contact with the radiation shield 28. Thus liquid nitrogen at 77° K. cools the entire volume within the radiation shield 28 to minimize thermal losses from the liquid helium vessel 26, at 4° K. The two liquid gas vessels 26 and 30 are entirely enclosed within the radiation shield 28 and further enclosed by the housing 16, which also surrounds the detector array 10. The interior of the housing 16 about the radiation shield 28 is evacuated through a vacuum valve 36, and insulated fill lines 37 and 39 provide access to the interiors of the liquid helium and liquid nitrogen vessels 26 and 30 respectively.

As best seen in FIG. 3, an integrated circuit chip 40 is also mounted on the holder 22 within the cryogenic volume below the cold work surface 24. The circuit chip 40 connects all of the detector elements 12 in the detector array 10, in multiplexed fashion, to a lesser number of micromechanical modulators 42 in a linear array 44. Driving signals for the circuit 40 are provided from a signal source 46 via insulated leads 48 which comprise the only external connection into the cryogenic zone. The modulator array 44 is spaced apart from the detector array 10 on the holder 22, with the integrated circuit chip 40 (described below in conjunction with FIG. 6) intervening.

On the opposite side from the detector array 10 a flood beam from a source 50 illuminates the modulator array 44 at an oblique angle through a small first window 52 in the housing 16. Light reflected off the array 44 is focused by imaging lenses 53, 54 and bounded by an intervening Schlieren stop 56. The focused modulated beam passes through a second small window 58 onto a linear light responsive detector array 60. Demultiplexer circuits 62 receiving the signals from the detector array 60 along with clock signals from the signal source 46 apply the signals representative of individual pixels to data processing circuits 64 that process the image data or reconstitute the image in digital (or analog) form. To this end, the data processing circuits 64 may include a frame buffer (not shown in detail) for storing the picture information as received.

Within the cold space, internal temperatures are minimized so that no internal heat sources introduce electrical noise in the detected signals. A pair of collector lenses 70, 71 within the housing 16 that focus the viewed image on the detector array 10 are mounted on cold fingers 73, 74 respectively thermally and mechanically coupled to the cold work surface 24. In the light beam paths to and from the micromodulator array 42, the imaging lenses 53, 54 and the Schlieren stop 56 are also thermally coupled to the cold work surface 24. Thus, attenuation losses in a typical optical element, of about 4%, do not appear as hot points in the system. Using small windows 52, 58 blocks off external hardware from appearing as substantial heat sources, and thermal energy may further be limited by using bandpass filters (not shown) to limit the transmitted light.

Although a great many radiant energy detector arrays are now known and used, as for thermal analysis, image recording, visible image generation and biomedical applications, the present example is directed toward a low noise infrared system. Modern infrared detector arrays have extremely high resolution and a great many elements in a compact space. Through the use of cryogenic cooling, they operate with extremely low noise and high sensitivity so that they can be utilized for astronomical studies, analysis of temperature differentials across the human body, and comparable scientific applications.

In the present system, the array 10 comprises a square arrangement of 64 detector elements on a side, giving a total of 4,096 detectors. There are, however, only 64×1 micromechanical modulator elements 42 in the readout system in a linear array. The infrared detector elements 12 are disposed in four symmetrical subarrays, having 32 detector elements on each side. The multiplexing circuits in the integrated circuit chip 40 further subdivide, on a time basis, the number of interconnections into 4×4 subgroupings of detector elements. Alternatively 8×8 subgroupings or 1×64 subgroupings could be used. The various subgroupings can be chosen arbitrarily as long as all detectors 12 are sensed in the course of a scan cycle. Signals from the detectors in each subgrouping are coupled to control individual ones of the linear array of micromechanical modulators 42 during each part of a scan cycle.

The flood beam source 50 may be a light emitting diode or laser. An appropriate conventional lens (not shown) may be used to provide a sheath of light passing through the first window 52 onto the micromechanical modulator array 44.

Figure 7:
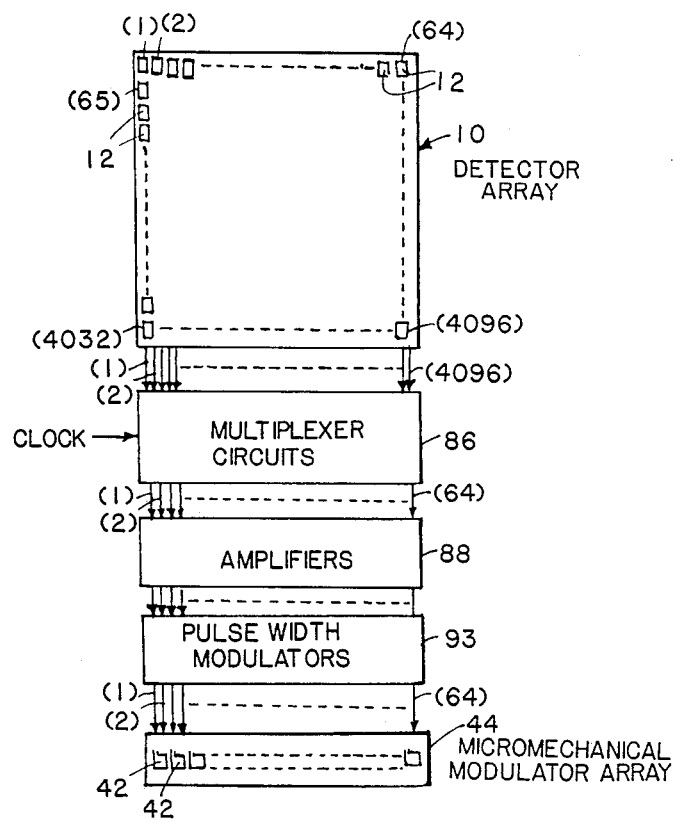
FIG. 7 is a block diagram of the principal circuit elements between the detector array and the micromechanical modulator array.

The micromechanical modulator elements 42 are here of the reflective, cantilevered type described in the above-referenced Petersen et al article and patent. Referring now to FIGS. 4 and 5, each element 42 comprises a generally rectangular paddle 78 substantially coextensive with, but smaller than, an underlying doped layer forming a well 80. Each paddle 78 is made of silicon dioxide, formed on a silicon substrate 82 on which is deposited a thin aluminum reflective layer 84 that is conductive and provides an electrode surface on the cantilevered paddles 84. An electrostatic charge on the layer 84 is generated in response to an applied input signal (e.g. the signal responsive to an infrared detector), and this charge causes movement of the paddle 78 downwardly toward the bottom of the well 80. This full deflection position is seen in FIG. 5, although the limit position at full deflection can be varied to be higher or lower. A characteristic of this micromechanical modulator element is that, in response to signals in excess of a certain threshold, the paddle 78 deflects fully, and remains in the fully deflected position until the deflecting electrostatic charge is reduced below a lower threshold. Particular advantage of this fact is taken, in accordance with the present invention, by utilizing processing and driving circuits as shown in FIGS. 6 and 7, to which reference is now made.

FIG. 6 generally depicts some of the detector elements 12 in a subgrouping within the array 10, multiplexer circuits 86 which receive clock signals so that individual micromechanical modulators 42 can be operated serially by different detectors 12, and circuits for generating binary-varying signals in response to deflection of the elements 42. Each detector 12 in the array 10 is coupled to provide individual output signals to a different one of a number of low noise transimpedance amplifiers 88. The cycle time of the modulators 42 is such that the scan rate could be comparable to that of a television signal (60 frames per second), but typically is lower, of the order of 10 frames per second for an infrared scanning system. With 16 individual detectors in each subgrouping coupled to the multiplexer, the scan clock operates at a rate of approximately 160 Hz. This provides far more than the time required to reset and then deflect the associated modulator element, which has a bandwidth of approximately 50 KHz. The cycle time available at the scanning clock rate is used first to return the micromechanical modulator element 42 to the undeflected position, and then to deflect it for a time interval which is proportioned to the amplitude of the input signal.

Low noise amplification is provided by a transimpedance amplifier 88 comprising a first pair of transistors 90, 92, the output from which is passed to the pulse width modulator circuit 93. An integrating circuit comprising a resistor 94 and capacitor 96 is coupled between a voltage source 95 and ground. The capacitor 96 charges at a rate proportional to the level of the input signal received from the amplifier 88. A third transistor 98 responsive to the clock signal is turned off to dump (reset to zero) the charge on the capacitor 96 so that another cycle can recommence with a different set of elements 12 in circuit with the devices 42. Consequently, the amplitude of the input signal to the detector 12 determines the voltage on the capacitor 96 at any point in time after charging starts. If this voltage is above the level of the threshold, applied to a comparator amplifier 99, as output signal is provided and the micromechanical modulator 42 is deflected to its limit position. When the detector 12 signal is large the capacitor 96 charges quickly and the modulator 42 is deflected with little delay. When the signal is low, more time is required to charge the capacitor 96 and the time delay before full deflection is longer. The width of the pulse subsequent to resetting is a measure of the amplitude of the signal received at the detector 12. A new signal measurement is undertaken each time the transistor 98 is turned off to reset the capacitor 96 to zero.

In the operation of the system of FIGS. 1 to 3, therefore, the image represented by the radiant energy pattern falling on the detector array 10 is sampled at a relatively low scan rate, 10 Hz. By scanning the detector elements 12 in subgroupings with the multiplexer circuit 86, only the 64 micromechanical modulator elements 42 are driven during each sampling time. This system, however, is fully compatible with the bandwidths of both the infrared detectors and the micromechanical modulators.

During operation, the detector elements 12 are held at the temperature of the cryogenic fluid (4.2° K.). The operating duration and temperature are adversely affected by heat losses in the system. Heat losses could be introduced by an excessive number of pin-outs, or an increase in the volume of the operative circuits and elements, or the presence of large viewing windows adjacent the cryogenically cooled space. The IR transmissive window 18 is typically pointed toward a cold source (such as outer space) and thus is generally not a major source of thermal losses if properly sized and arranged. In the present example, the entire detector array 10, integrated circuit chip 40 and micromechanical modulator array 44 are isolated within the housing 16. Although there are internal interconnections between the micromechanical modulator array 44 and the integrated circuit chip 40, the modulator array is effectively isolated, both electrically and thermally, from the signal detecting elements. Crosstalk and thermal noise are both minimized. Nonetheless, because many signals are transmitted in parallel through the small windows 52, 58 in the housing 16 the readout rate is rapid. Although the micromechanical modulator array here faces in the opposite direction from the detector array, it may be disposed at some other angle, provided that the field of view of the detector array 10 is not partly occluded. Also, the non-parallel disposition cannot be such as to require the circuit connections as to be excessively dense.

By converting the detected signals to pulse width modulated form, and operating the micromechanical modulator elements 42 in the threshold mode, the signal transmission is converted to essentially digital form. There is essentially parallel, equivalent, radiation transferred between the individual micromechanical modulators and the corresponding elements of the detector array. Light from undeflected modulators 42 is effectively blanked out by the combustion of the imaging lenses 53, 54 and the Schlieren stop 56. The light patterns from those elements 42 that are deflected all have a substantially uniform angle due to the pulse width modulation, and all reflections from actuated elements 42 appear at the object plane. Consequently the pulse width modulated input signals are regenerated (with higher gain if desired) at the light detector array 60. The pulse width modulated signals can be regenerated in analog form by the use of integrating circuits, e.g. capacitors, or may be converted to binary values simply by counting their durations in the data processing circuits 64 as they are successively received from demultiplexer circuits 62. Recognizing that multiple signals are provided in parallel, some parallel processing can advantageously be used at the output, depending upon the application intended for the image data.

It will be recognized that other types of Schlieren optical systems may be utilized, including the illumination of the micromodulator array by a beam splitter in the optical path, the usage of a Schlieren stop at the focal point, and the disposition of detectors for both the undeflected and fully deflected positions.

While there have been described above and illustrated in the drawings various forms and exemplifications in accordance with the invention it will be appreciated that the invention is not limited thereto but encompasses all variations and expedients within the scope of the appended claims.

What is claimed is:

1. A signal processing system for multiple parallel input signals comprising:
    means responsive to the multiple parallel input signals for generating individual signals varying in binary fashion in response to the amplitudes of individual ones in subsets of the input signals;
    an array of signal responsive, deflectable reflective elements disposed in an object plane;
    means responsive to the binary signals in subsets of the input signals for controlling deflection of the reflective elements;
    illuminator means spaced apart from the reflective elements and reflecting light off the elements toward an image plane; and
    means including an array of detector elements disposed at the image plane and each responsive to the light deflected off a different reflective element for providing a multiple output signal representative of the input signals.

2. The invention as set forth in claim 1 above, wherein the means for generating a multiplicity of input signals comprises an array of signal sensing elements disposed apart from the array of reflective elements, and circuit means comprising multiplexer circuits disposed between the array of signal sensing elements and the array of reflective elements and coupled to both.

3. The invention as set forth in claim 2 above, wherein the circuit means further comprises a plurality of circuits generating pulse width modulated signals for the means for controlling deflection of the reflective elements, the signal amplitudes of the pulse width modulated signals in one binary state providing full deflection of the associated reflective element.

4. The invention as set forth in claim 2 above, wherein the array of signal sensing elements comprises a radiant energy detector array generating individual analog signals and wherein the reflective elements are disposed in a linear array.

5. The invention as set forth in claim 1 above, further comprising means responsive to signals from the detector elements for providing multiple digital output signals.

6. The invention as set forth in claim 1 above, further comprising a Schlieren stop for transmitting the light deflected from the reflective elements to said means including an array of detector elements.

7. A system for generating image-defining signals in response to a radiant energy image, comprising:
    means defining a cooling source and providing a substantially enclosed cold zone;
    means including an array of radiant energy sensitive detector elements within the cold zone in thermal contact with the cooling source and exposed to the radiant energy image for generating a plurality of concurrent signals of amplitude responsive to different components of the radiant energy image;
    a plurality of micromechanical devices equal to or less in number than the array of detector elements adjacent but spaced apart from the detector array, the micromechanical devices each including a bendable reflective element movable between an undeflected and a fully deflected state;
    circuit means within the cold zone between the detector elements and micromechanical devices, and responsive to the signals from the detectors for applying binary-varying signals to the micromechanical devices to provide undeflected and fully deflected states, the circuit means providing binary-varying signals in successive groupings to the micromechanical devices; and
    optical means operable through the housing means for sensing the deflection states of the micromechanical devices.

8. The invention as set forth in claim 7 above, wherein the system further includes a cold surface in thermal contact with the cooling source and the detector elements are in thermal contact with the cold surface, and further comprising a housing means that encompasses the cooling source and comprises first window means for transmitting the radiant energy image to the detector elements and second window means in association with the optical means.

9. The invention as set forth in claim 8 above, wherein the optical means comprises means outside the second window means for illuminating the micromechanical devices, a detector array outside the second window means for sensing illumination reflected off the micromechanical devices, and means within the cold zone for providing a distributed image corresponding to the micromechanical devices at the detector array.

10. The invention as set forth in claim 7 above, wherein the system further comprises circuit means disposed intermediate the detector elements and the micromechanical devices for coupling signals from individual detector elements to deflect individual ones of the micromechanical devices fully or to hold the micromechanical devices undeflected.

11. The invention as set forth in claim 10 above, wherein the circuit means provide pulse duration modulated deflection of the micromechanical devices, wherein the number of detector elements comprises an integral multiple of the number of micromechanical devices, and wherein the circuit means comprises means for driving each micromechanical device sequentially with signals from the different ones of a subset of the detector elements.

12. The invention as set forth in claim 11 above, wherein the detector arrays are disposed closely adjacent and present operative faces in opposite directions.

13. The invention as set forth in claim 10 above, wherein the circuit means further comprises means for sampling the subsets of detector elements at a first scanning rate and wherein the system further comprises means coupled to the optical means for distributing signals therefrom in synchronism with the sampling.

14. A system responsive tot he amplitudes of individual picture elements in incoming radiant energy image patterns, comprising:

a plurality of radiant energy detectors distributed in an array throughout an image are and each responsive to intensity variations corresponding to a different picture element in the image patterns;

drive circuit means responsive to one or more detectors and generating a drive signal in response thereto;

a plurality of spatial light modulators in an object plane, each deflectable to a limit position for a period of time in response to a different signal;

flood beam means illuminating the light modulators to direct light reflected therefrom toward a remote focal plane; and a plurality of light detectors positioned at the focal plane to be individually responsive to light from different ones of the fully deflected modulators.

15. The invention as set forth in claim 14 above, further comprising means cooling the detectors.

16. The invention as set forth in claim 14 above, further including multiplexer means in association with the drive circuit means for coupling different individual ones of the detectors to different individual ones of the light modulators.

17. The invention as set forth in claim 14 above, wherein the drive circuit means includes a plurality of drive circuits each comprising low noise amplifier means responsive to a detector signal for generating an analog signal, integrator circuit means coupled to receive the analog signal, comparator means for providing a signal in response to excursion of the integrated analog signal above a predetermined threshold, and means responsive to the signal from the comparator means.

18. The invention as set forth in claim 14 above, wherein the drive circuit means includes a plurality of drive circuits each responsive to a different detector and generating a pulse width modulated drive signal in response thereto, and wherein the light detectors provide an output signal defining the incoming image that is pulse width modulated.

19. The invention as set forth in claim 18 above, wherein each drive circuit comprises a low noise amplifier means responsive to the detector signal for generating an analog signal, integrator circuit means coupled to receive the analog signal, comparator means for providing a signal in response to excursion of the integrated analog signal above a predetermined threshold, and pulse width modulator means responsive to the signal from the comparator means.

20. A system for deriving digital information from a multiple element array of signal generating elements having a predetermined bandwidth and generating a variable amplitude signal, comprising:

a lesser plurality of optical deflecting means each having a substantially wider bandwidth than the signal generating elements;

means coupling subgroupings of the multiple element array to the optical deflecting means, with each one of the signal generating elements in a subgrouping being coupled to a different optical deflecting means for a predetermined interval, the coupling means including means for deflecting the deflecting means for an interval responsive to the amplitude of the corresponding variable amplitude signal; and means for optically reading the deflection states of the optical deflecting means.

21. The invention as set forth in claim 20 above, further comprising means responsive to the optically read states for deriving information as to the signals from all of the signal generating means.

22. The invention as set forth in claim 20 above, wherein the system further comprises an enclosure encompassing the signal generating elements, optical deflecting means and the coupling means, and the means for optically reading are disposed outside the enclosure.

23. The invention as set forth in claim 20 above, wherein the means for optically reading reads the deflection states in parallel.

* * * * *